United States Patent [19]

Taylor et al.

[11] Patent Number: 4,510,604
[45] Date of Patent: Apr. 9, 1985

[54] OPERATION OF A TWO-PHOTON THREE LEVEL LASER

[75] Inventors: Lyle H. Taylor, Murrysville; William H. Kasner, Penn Hills Township, Allegheny County, both of Pa.

[73] Assignee: Westinghouse Electric Corp., Pittsburgh, Pa.

[21] Appl. No.: 441,129

[22] Filed: Nov. 12, 1982

Related U.S. Application Data

[62] Division of Ser. No. 195,906, Oct. 10, 1980, Pat. No. 4,375,689.

[51] Int. Cl.³ .............................................. H01S 3/097
[52] U.S. Cl. .......................................... 372/4; 372/92
[58] Field of Search ...................... 372/4, 55, 107, 92, 372/70, 91

[56] References Cited

U.S. PATENT DOCUMENTS 4,168,474 9/1979 Pleasance .............................. 372/55

Primary Examiner—James W. Davie
Attorney, Agent, or Firm—M. P. Lynch

[57] ABSTRACT

The operation of a two-photon, three level laser system at high temperatures or pressures is made possible by reducing the build up time of the flux of the second lasing transition in the laser discharge region.

2 Claims, 7 Drawing Figures

F I G. I

4,510,604

OPERATION OF A TWO-PHOTON THREE LEVEL LASER

This is a division of application Ser. No. 195,906, filed Oct. 10, 1980, now U.S. Pat. No. 4,375,689.

Two-photon three level lasers can be defined as lasers that lase at two wavelengths where the lower laser level for the first lasing transition is the upper laser level for the second lasing transition. More specifically, the first lasing transition dumps energy from the top laser level to an intermediate laser level. A population inversion is thereby created between the intermediate laser level and a lower laser level which results in the second lasing transition.

In some cases, the operation of the two-photon, three level laser is restricted to low temperature and/or pressure since the collision depletion of the intermediate laser level population reduces the population inversion necessary for the second lasing transition.

SUMMARY OF THE INVENTION

There is disclosed herein with reference to the accompanying drawings a technique for enhancing the operation of two-photon, three level lasers at low temperatures and/or pressures and for extending the operation of these lasers to elevated pressures and/or temperatures. These improvements are achieved by decreasing the build-up time of the laser flux for the second lasing transition such that the stimulated transition rates within the lasing medium can compete favorably with the undesirable relaxation rates which accompany high temperatures and/or pressures. This desired result can be achieved by:

1. Placing the resonator mirrors as close as possible to the lasing medium; and/or
2. Priming the laser with an external optical pump(s) at one or both of the lasing wavelengths.

The first approach reduces the transit time of the lasing radiation through any no-gain, or negative gain, medium thereby increasing the total system gain which in turn reduces the time needed to build up the lasing radiation to significant intensities.

The second approach allows the lasing radiation to build up from an intensity level determined by the external pump lasers which can be many orders of magnitude higher than the spontaneous emission intensity levels from which the lasing radiation is normally developed. The net effect is again to reduce the time needed to build up the lasing radiation to significant intensities. When employing the second method, the intensity of the external pumps is increased to such an extent that the stimulated transition rates within the lasing medium can compete favorably with the undesirable relaxation rates which accompany high temperatures and/or pressures.

The successful implementation of the above described techniques for extending the operation of two-photon, three level laser systems to elevated pressures and/or temperatures is based on the condition that the initial energy level populations, i.e. just prior to lasing, do not change with temperature and pressure in such a way that the potential improvement is negated. Theoretical calculations indicate that the 16 $\mu$m $CO_2$ bending mode laser, described in U.S. Pat. No. 4,168,474, issued Sept. 18, 1979, assigned to the assignee of the present invention and incorporated herein by reference, satisfies this condition, and is used as an example to explain the important features of the invention.

DESCRIPTION OF THE DRAWINGS

The invention will become more readily apparent from the following exemplary description in connection with the accompanying drawings.

DESCRIPTION OF THE PREFERRED EMBODIMENT

Figure 1:
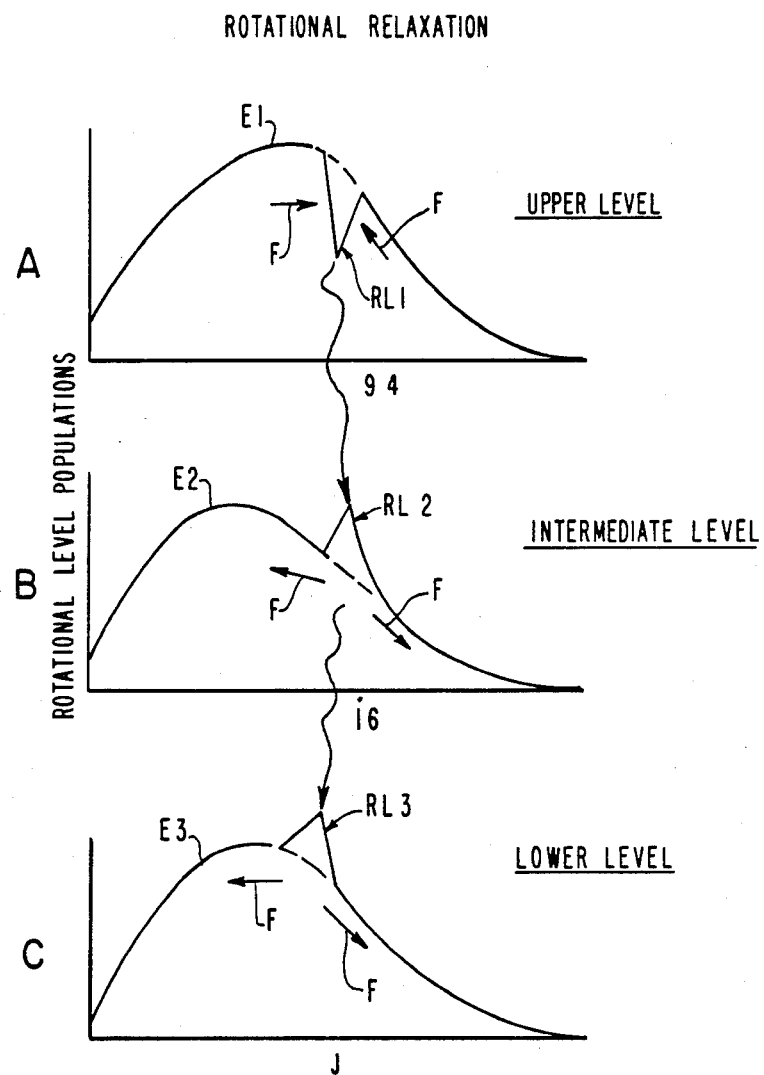
FIGS. 1A, 1B and 1C are graphical illustrations of rotational relaxation in a $CO_2$ bending mode laser.
Figure 2:
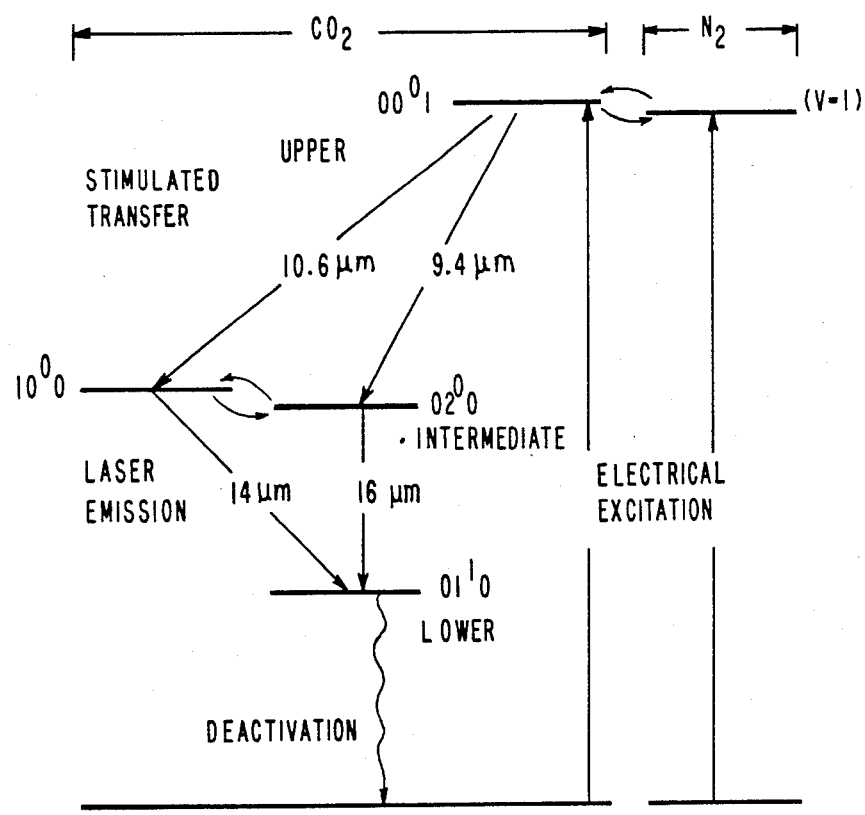
FIG. 2 is a vibrational energy level diagram showing the process leading to 9.4-micron and 16-micron laser emissions.

The phenomena which provides the basis for the appreciation of the disclosed technique for extending the operation of two-photon, three wavelength laser systems higher pressures and/or higher temperatures, e.g., the ambient conditions of 300° K. and 760 Torr, is typically illustrated for the 16 $\mu$m $CO_2$ laser system in FIGS. 1A, 1B and 1C. The vibrational energy level diagram for the well-known 16 $\mu$m laser system is illustrated in FIG. 2 with the three levels corresponding to an upper laser level of $00^01$, an intermediate level $02^00$, and a lower level of $01^10$.

The transfer of energy from the upper level to the intermediate level, and from the intermediate level to the lower level involves directly only the rotational levels from which the lasing originates or terminates. Within each vibrational level the non-equilibrium population of these rotational levels communicates with the other rotational level populations by rotational-rotational energy exchanges, i.e., by rotational relaxation.

The successful implementation of the disclosed technique requires a two-photon, three level laser system having stimulated emission transitions which have a common rotational level within the plurality of rotational levels contained within the envelope, or manifold, E2 of FIG. 1B. For the purposes of discussion, a common rotational line J is chosen. In the illustration of FIGS. 1A-1C, where J is the rotational quantum number, the arrows F indicate the general direction of population flow due to rotational relaxation.

For the purposes of discussion the disclosed technique will be described in its application to a 16 $\mu$m $CO_2$ bending mode laser such as that schematically illustrated in FIG. 3. The vibrational energy level diagram for this laser is illustrated in FIG. 2. The major interactions of the 16 $\mu$m $CO_2$ bending mode laser are also illustrated in FIG. 2. A detailed description of the operation of this 16 $\mu$m laser is provided in U.S. Pat. No. 4,168,474 referenced earlier. The lasing medium, LM, of the laser system of FIG. 3 consists of a gas composition including a lasing gas $CO_3$ an energizing gas $N_2$, and, optionally, a buffer gas He which is present within a laser discharge region LD. The laser medium is electrically excited by a discharge pulse from the electrical excitation source ES.

As in a conventional $CO_2$ laser, the $00^01$ level of $CO_2$ and the vibrational states of $N_2$ are preferentially pumped by the electrical discharge. After the discharge pulse, the excited $N_2$ transfers much of its excitation energy to the upper $CO_2$ level, $00^01$, via vibrational-vibrational collisions, while the lower level, $01^00$, loses much of its excitation energy by vibrational-translational collisions with the He atoms of the laser gas mixture LM.

The population inversion on the 9.4 μm laser transition created by transfer of vibrational energy from $N_2$ to the upper $CO_2$ level, $00^01$, is transferred to the intermediate $CO_2$ level, $02^00$, by stimulated emission caused by an externally delivered 9.4 μm laser pulse from pulse source PS1, at an optimum time after the discharge pulse from the excitation source ES. The optimum time corresponds to the time when the potential population inversion for 16 μm lasing is maximum. This stimulated transfer generates a population inversion between the intermediate level, $02^00$, and the lower level, $01^10$, which results in laser emission at 16 μm.

Referring to FIG. 1A, the 9.4 μm lasing effectively "burns a hole" RL1 in the rotational manifold E1 for example at the rotational level $J_o$-1 and the rotational relaxation F feeds the population from the remaining rotational lines of the manifold E1 into the "hole" RL1. This transfer of energy from the entire manifold E1 to the hole RL1 of FIG. 1A of the upper level is a desirable result.

On the other hand, the 9.4 μm lasing transition produces an overpopulated rotational level RL2 in the intermediate laser level of FIG. 1B, for example at the rotational level $J_o$ of the manifold E2 and the corresponding rotational relaxation F reduces the overpopulation. The 9.4 μm lasing transition thereby generates the population inversion necessary for 16 μm lasing transition between the intermediate level, $02^00$, and the lower level, $01^10$, but some of this inversion is lost by rotational relaxation within the rotational manifold E2. While this loss can be considered to be a positive factor with respect to the 9.4 μm lasing transition, it reduces the population inversion for the 16 μm transition and thus for this lasing transition the loss is detrimental. Once again, as stated above, this conclusion is valid only when the two lasing transitions have a common rotational level such that the lower rotational laser level for the first photon transition is the upper rotational laser level for the second photon transition.

The second photon lasing, i.e., 16 μm, produces a rotational level population situation in the lower laser level $01^10$ which is analogous to that produced in the intermediate laser level $02^00$ by the first photon lasing, i.e., 9.4 μm. However, in the second photon lasing transition the rotational relaxation depletion of the overpopulated RL3 of the manifold E3 of FIG. 1C is desirable inasmuch as it increases the population inversion for the second photon lasing transition by reducing the bottlenecking in the lower laser level, for example at the rotational level $J_o$-1 in the manifold E3.

Thus, it is apparent from the above discussion that rotational relaxation has a positive influence in two-photon, three level laser system in the upper and lower laser levels, but has a negative effect at the intermediate laser level. This experimentally verified effect of rotational relaxation on the performance of two-photon, three laser level systems accounts in part for the generally accepted requirement to operate such laser systems at low pressure, i.e., between 5 and 50 Torr, and low temperatures, i.e. less than 220° K. These operational restrictions impose significant engineering requirements on the system for cooling and sealing.

Figure 4:
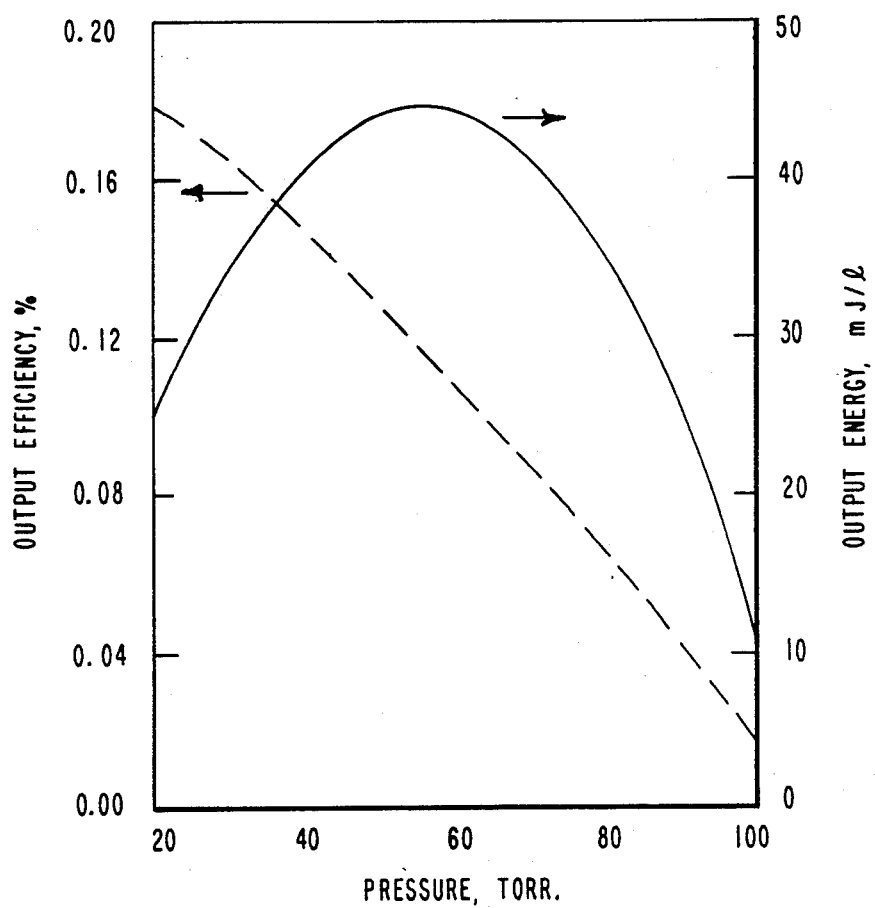
FIG. 4 is a graphical illustration of the dependence of laser output efficiency and energy on gas pressure, showing the effects of rotational relaxation.
Figure 5:
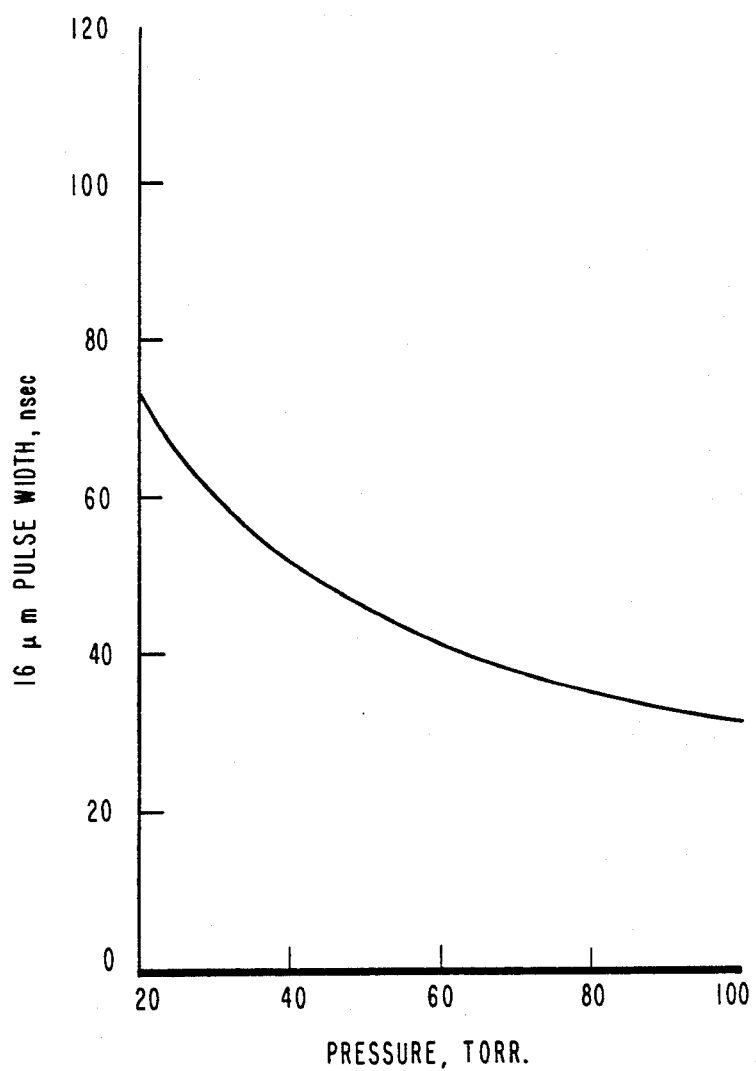
FIG. 5 is a graphical illustration of the dependence of laser pulse width on pressure, showing the effects of rotational relaxation.

The graphical illustration of FIG. 4 illustrates the expected dependence of laser output efficiency and energy on gas pressure, showing the effects of rotational relaxation. FIG. 5 depicts the expected dependence of laser pulse width on pressure, showing the effects of rotational relaxation.

Having identified rotational relaxation, as illustrated in FIGS. 1A–1C, as a factor restricting the operation of two-photon, three level laser systems at higher temperatures and pressures, the negative effect of rotational relaxation at the intermediate laser level can be minimized by decreasing the build-up time of the second photon laser flux. This desired condition can be achieved by either increasing the rate at which the intensity of the second laser flux is increased, or by establishing an initial bias intensity level through the use of an external source of radiation, such as a pump laser source, thereby reducing the time needed to reach the desired magnitude of laser flux for the second lasing transition.

Figure 3:
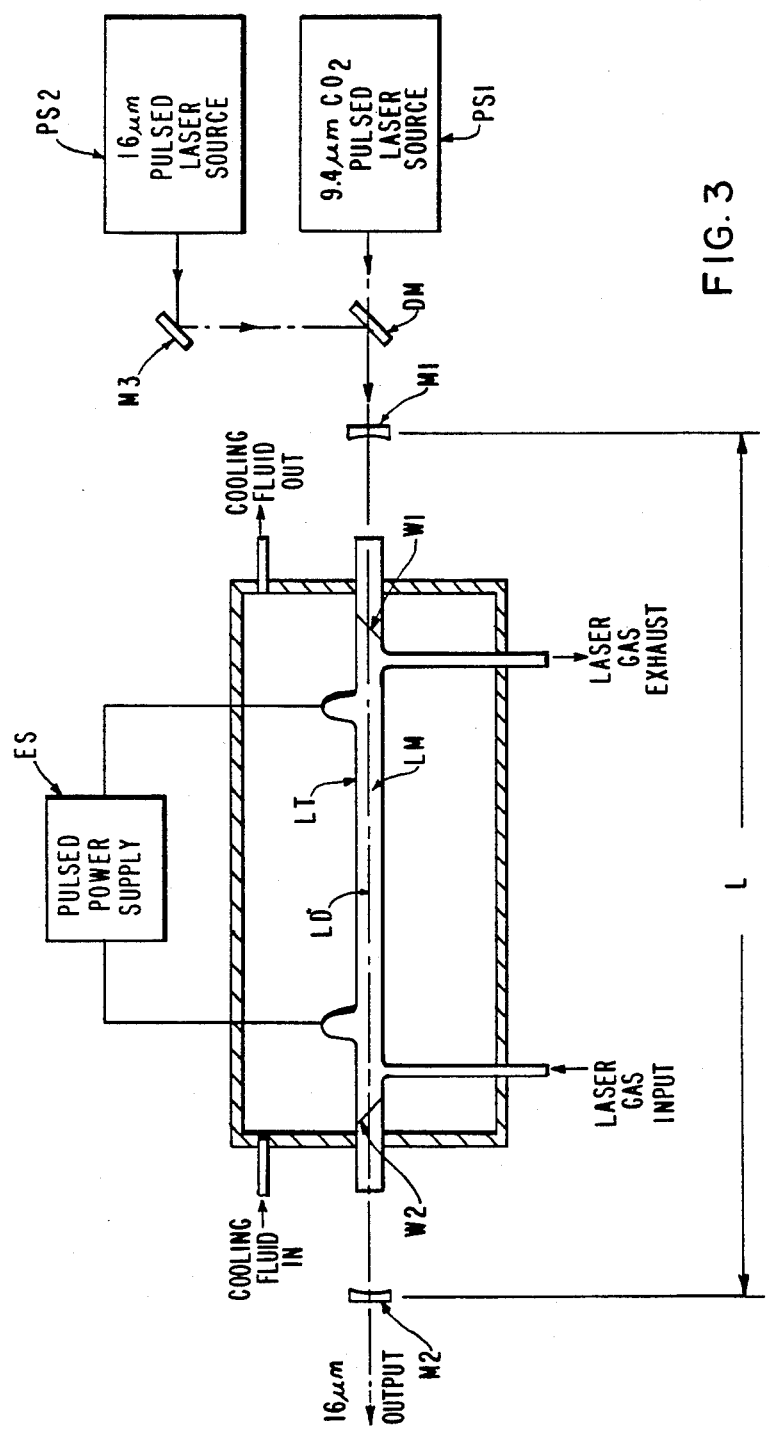
FIG. 3 is a sectioned schematic illustration of a 16 $\mu$m laser system.

The former method of achieving the desired decrease in build up time of the second photon laser flux can be implemented as shown with reference to FIG. 3 by positioning the mirrors M1 and M2 as close as possible to the laser discharge region LD defined within the laser tube LT by the laser windows W1 and W2. The distance L between the mirrors defines the optical cavity of the laser system 10. The length l of the laser medium LM is defined to be the distance between the laser windows W1 and W2.

The intensity I of the second photon laser flux within the laser cavity defined by the mirrors M1 and M2 is given approximately as follows:

$$I = I_o e^{N\alpha l/L}$$

where $\alpha$ is the gain of the laser medium; l is the length of the laser medium, L is the distance between the mirrors, N corresponds to the number of passes within the laser cavity, and $I_o$ is the initial intensity. It is apparent from the above relationship that the build-up rate of the intensity I of the laser flux can be increased by minimizing the distance L between the mirrors M1 and M2. While the embodiment of FIG. 3 illustrates the mirrors being external to the windows, the mirrors can be located within the laser tube adjacent to the laser discharge region.

A second approach for achieving the desired objective of decreasing the build-up time of the second photon laser flux intensity involves the use of another external source of radiation, such as the pulsed laser source PS2, to establish a preset bias, or level, of the second photon laser flux intensity within the laser cavity to thereby reduce the necessary additional laser flux intensity build-up time required to support the lasing transition between the intermediate laser level and the lower laser level. In other words, $I_o$ is increased. The reduction in required additional laser flux intensity build-up results in a corresponding decrease in the required build-up time.

Several techniques exist for generating the second photon laser flux in the external laser source, PS2, shown in FIG. 3. In the example of the 16 μm $CO_2$ bending mode laser used to illustrate the disclosed concept, the external laser source, PS2, could be a small 16

μm $CO_2$ laser constructed using the teaching of referenced U.S. Pat. No. 4,168,474. The 16 μm laser output from PS2 can be injected into the optical path using a turning mirror M3 and a dichroic mirror, DM, as shown in FIG. 3. Dichroic mirrors, or gratings, which might also be used to combine the pump beams from PS1 and PS2 are available in the present technology.

The teaching of the disclosed invention for improving the operation of a two-photon laser does not specifically require that the external laser PS2 operate in a pulsed mode. Continuous wave, CW, operation of this laser is also acceptable and is considered to be a part of the teaching of this application.

Thus, a two-photon, three level laser system which heretofore has operated successfully only at low temperatures and/or pressures where an energy loss to adjoining rotational lines is minimal, can now be operated at high temperatures, e.g., above 200° K., and/or high pressures, e.g., above 50 Torr, and the potential energy loss resulting from high temperature and/or high pressure operation to adjoining rotational lines can be minimized be reducing the build-up time of the laser flux intensity at the intermediate laser level as described above.

Furthermore it is clear that the same procedures which extend the operation of these lasers to high temperatures and/or pressures, can also be used to improve their performance at low temperatures and/or pressures.

What we claim is:

1. A method for improving the performance of two-photon, three level laser system including a laser medium disposed within a laser discharge region including spaced apart optical elements defining an optical cavity within said laser discharge region, wherein lasing occurs at two wavelengths with the lower laser level of the first lasing transition being the upper laser level of the second lasing transition, the intensity I of the second photon laser flux within the laser cavity defined by spaced apart optical elements being approximately equal to $I_0 e^{N\alpha l/L}$ where $\alpha$ is the gain of the laser medium; l is the length of the laser medium; L is the distance between the optical elements; N corresponds to the number of passes within the laser cavity; and $I_o$ is the initial intensity, comprising the step of:

positioning said spaced apart optical elements at a distance L which approximates but is not equal to or less than l in order to reduce the buildup time of the laser flux of the second lasing transition in the laser discharge region of said laser system.

2. In a two-photon, three level laser system, including a laser medium disposed within a laser discharge region wherein lasing occurs at two wavelengths with the lower laser level of the first lasing transition being the upper laser level of the second lasing transition, the intensity I of the second photon laser flux within the laser cavity defined by spaced apart optical elements being approximately equal to $I_0 e^{N\alpha l/L}$ where $\alpha$ is the gain of the laser medium; l is the length of the laser medium; L is the distance between the optical elements; N corresponds to the number of passes within the laser cavity; and $I_o$ is the initial intensity, the improvement for reducing the buildup time of the laser flux of the second lasing transition in the laser discharge region of said laser system, said improvement comprising:

optical elements disposed within said laser discharge region to define said laser cavity being spaced apart by a distance L which approximates but is not equal to or less than l.

* * * * *